(No Model.)
W. G. NIXON.
METALLIC PACKING.
No. 434,418.
2 Sheets—Sheet 2.
Patented Aug. 12, 1890.
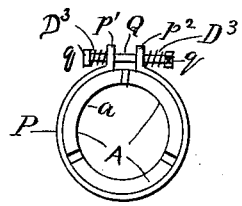
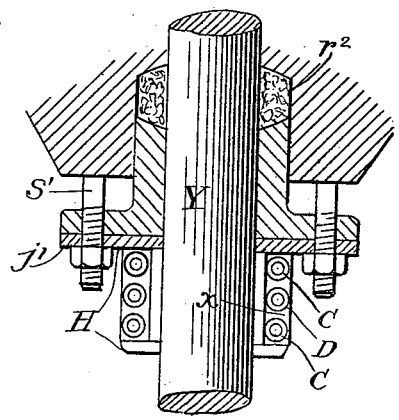
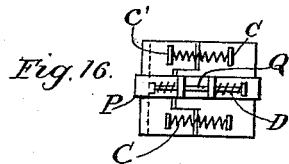
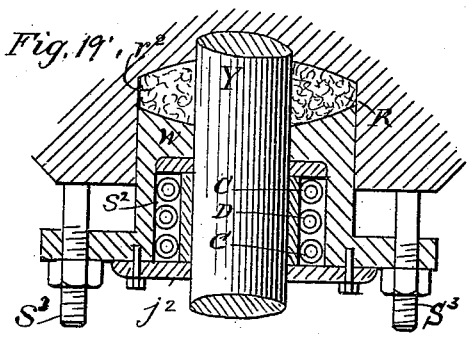
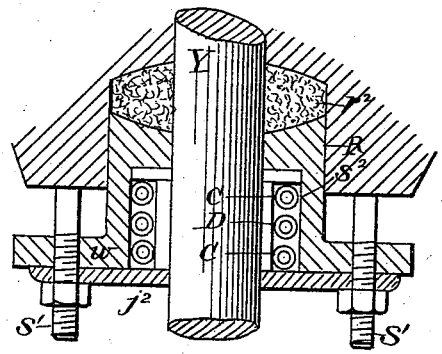
Attest:
Albert McMahon
Frank A. Keller
Inventor:
William Guy Nixon
per
James N. Lancaster
Attorney

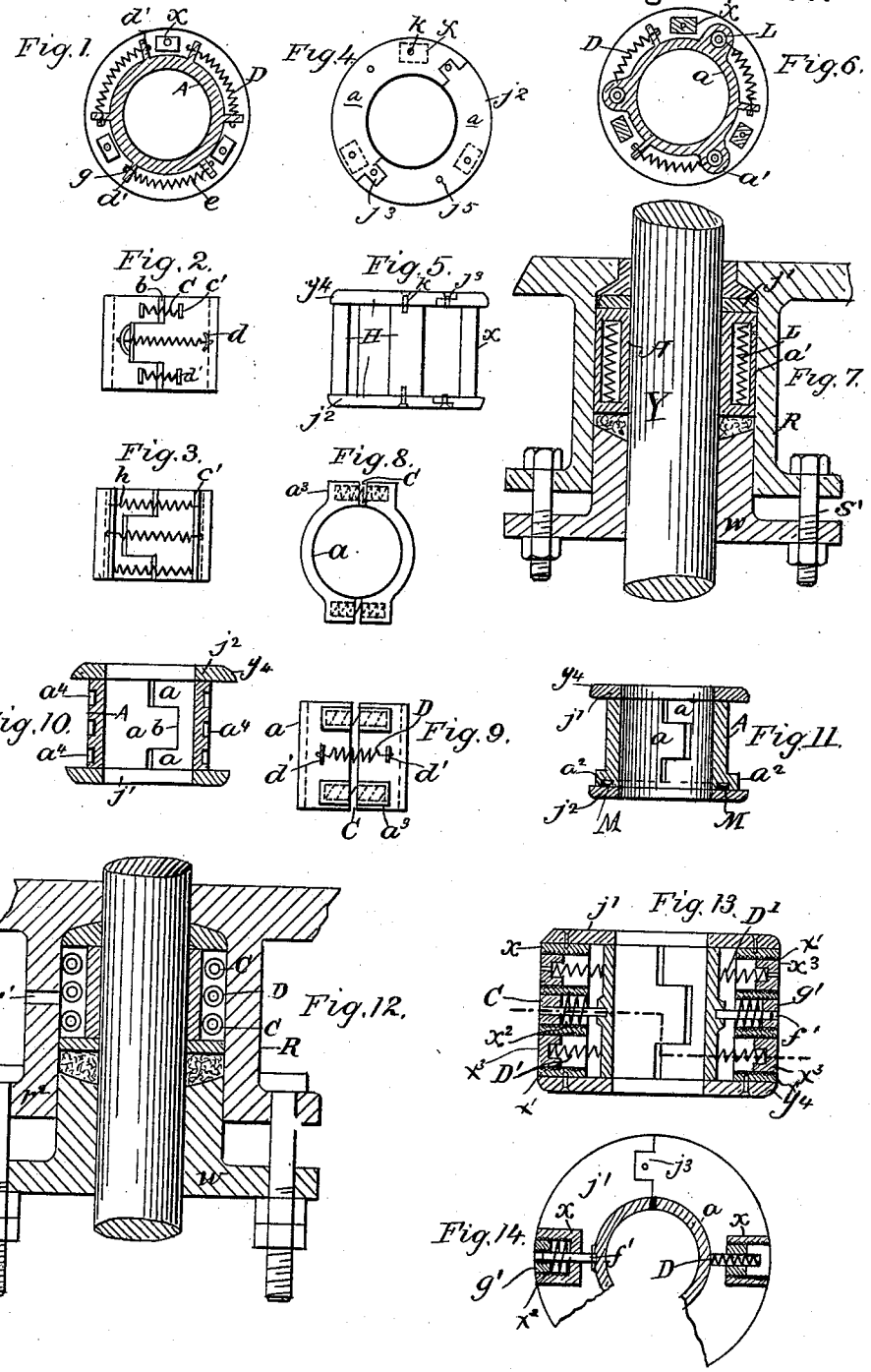

UNITED STATES PATENT OFFICE.

WILLIAM GUY NIXON, OF BRISTOL, ENGLAND.

METALLIC PACKING.

SPECIFICATION forming part of Letters Patent No. 434,418, dated August 12, 1890.

Application filed November 14, 1889. Serial No. 330,261. (No model.) Patented in England October 15, 1888, No. 14,794.

*To all whom it may concern:*

Be it known that I, WILLIAM GUY NIXON, a subject of the Queen of Great Britain, and a resident of Bristol, in the county of Somerset, England, have invented certain new and useful Improvements in Metallic Packing, (for which I have obtained a patent in Great Britain, No. 14,794, dated October 15, 1888,) of which the following is a full, clear, and exact specification.

My present invention relates to metallic packing which is used more especially for glands or where it is necessary to form a tight joint for the prevention of the escape of air, steam, water, or other element under pressure—such, for instance, as the packing of the gland of a steam-cylinder—and the object thereof is to construct and arrange the said packing so that a tight or hermetical joint is constantly secured between the piston-rod or other reciprocating or revolving rod, spindle, or other part of a machine and the casing of the cylinder or other vessel which contains the steam or other element under pressure, and at the same time to considerably reduce the friction caused by said packing pressing upon the said piston-rod or other reciprocating or revolving rod or spindle. I attain this by employing metallic packing constructed and arranged according to my present improvements, and illustrated by means of the drawings hereunto attached, of which the following is a description.

Figure 1 is a sectional plan of one arrangement of my improved metallic packing, and Fig. 2 is an elevation of same having the cage removed, and Fig. 3 is also an elevation of same, but showing a slight modification. Fig. 4 is a plan of a cage constructed to contain and also to form part of my improved packing, and Fig. 5 is an elevation of same. Fig. 6 is a sectional plan of a modification of my improved packing, and Fig. 7 a sectional elevation showing the same placed or fitted into a stuffing-box. Figs. 8 and 9 are respectively plan and elevation of my improved packing, illustrating a modification thereof; and Figs. 10 and 11 are sectional elevations showing some further slight modifications. Fig. 12 is a sectional elevation showing improved packing fitted or contained within an ordinary stuffing-box. Fig. 13 is a sectional elevation, and Fig. 14 part sectional plan, of modification of packing; and Figs. 15 and 16 are respectively sectional plan and elevation of another form of packing with cage removed. Figs. 17, 18, and 19 are sectional elevations illustrating several ways of attaching my present improved metallic packing to the glands or outsides of the stuffing-boxes of steam or other cylinders.

Like letters designate similar parts in each figure.

Referring to Figs. 1, 2, 3, 4, and 5, the metal packing-ring A is arranged in segments $a$, which are lipped or dovetailed one to the other somewhat after the manner of an ordinary piston-ring joint, as shown at $b$. On the outside or external periphery of the packing-ring A are attached springs C and D, which may be the form shown or any other desired form or section, so as to be adapted to suit limited space or other requirements, as will be well understood. The said springs C and D are arranged over each joint $b$, the two springs C endeavoring to expand or press the segments away from each other or apart, and the spring D simultaneously tends to compress the packing-ring A or draw the said segments $a$ together. Each segment $a$ has lugs $c'$ and $d'$, either made with or attached to their exterior periphery and arranged at a suitable position thereon, as shown at Fig. 2; or instead of separate lugs $c'$ $d'$ the lugs $c'$ may extend across the packing A, as shown at Fig. 3, and so answer for both purposes. One end of the spring D is attached to the lug $d'$, the other end of said spring D being attached to the opposite lug $d'$ with a nut $g$, by which means the spring D may be adjusted. The springs C are secured in position by means of pressing against the lugs $c'$, which have small projections $h$, which extend a little along the inner parts of said springs C, and so prevent them moving from position. It will be obvious that where preferred any other suitable means may be employed for attaching the springs D and C to the lugs $d'$ and $c'$.

The cage H, Figs. 4 and 5, is arranged to contain the segmental packing-ring A, and is constructed with two flat hoops $j'$ and $j^2$, which are preferably made in halves and then dovetailed or otherwise fitted together, as shown at $j^3$. The external edges $j^4$ of said hoops are tapered or otherwise suitably formed so as to fit well into stuffing-box when so employed. The hoops $j'$ and $j^2$ are connected to each other by means of distance-pieces $x$, which may either be made in one with the hoops $j'$ or $j^2$, or made separate and connected to said hoops by means of set-screws $k$, as shown. The cage H is shown with three distance-pieces $x$, but may have more or less, as required. The hoops $j'$ $j^2$, also, may be made in more than two pieces or may be each all in one piece, as desired. Suitable small holes $j^5$ are formed in the hoop $j^2$ for the purpose of drawing cage away with packing when desired.

Referring to Figs. 6, 7, and 11, one end of the packing-ring A is kept constantly pressed or tight against the inner side of hoop $j'$, either by means of suitable spiral springs L, arranged in boxes $a'$, which are either made with or attached to the segments $a$, Figs. 6 and 7, or by means of a wave-spring M, arranged in a groove $a^2$, formed in segments $a$, as shown at Fig. 11.

Referring to Figs. 8, 9, and 10, the springs C are arranged in boxes $a^3$, which are either made with or attached to the outer sides of segments $a$, Figs. 8 and 9, and the said packing A may have suitable grooves or channels $a^4$ formed around it, as shown at Fig. 10, which are for the purpose of receiving any lubricating substance or white or other metal, as desired.

Referring to Figs. 13 and 14, the distance-pieces $x$ are formed with threaded holes $x'$ and $x^2$. The threaded holes $x'$ receive hollow nuts $x^3$, which press down a spring D' onto exterior periphery of the packing-ring A, and the holes $x^2$ receive a nut $g'$, which has a threaded hole in its center for the reception of the threaded end of the bolt $f'$. The other end of this bolt is pinned or otherwise attached or secured to the segment $a$ of packing. The nuts $x^3$ and $g'$ may be regulated so as to adjust the pressure caused by the springs D' and C'. It will be clearly discerned that the springs D' tend to compress or force the segments $a$ together during the time that the springs C' endeavor to expand or press the said segments $a$ apart.

Referring to Figs. 15 and 16, a band P passes around, preferably, the center of the packing A, and is made with projections $p'$ and $p^2$, through which passes a suitable bolt Q, which has a head $q$ and nut $q'$. A suitable spiral or other spring $D^3$ is arranged between the head $q$ and projection $p'$, and a spring $D^3$ is also placed between the projection $p^2$ and nut $q'$. By means of screwing or unscrewing the nut $q'$ the pressure on the springs $D^3$ may be adjusted. The band P, in combination with the springs $D^3$ and bolt Q, tends to compress or close the segments $a$, and simultaneously the springs C endeavor to expand or press the same apart. In this case it will be obvious that when desired the bolt Q may be dispensed with as well as the springs $D^3$, and a suitable spring, arranged so as to tend to draw together the ends $p'$ $p^2$ of ring P, may be fixed between said ends and so bent to compress or close the segments $a$ with or without the means of adjustment.

My improved packing may be placed or fitted within the stuffing-boxes R, Figs. 7 and 12. These boxes R have preferably holes $r'$ for the purpose of conducting suitable lubricant to the improved packing when it is necessary so to do. Where the improved packing is placed within the stuffing-box R, as described, I preferably place one ring or lap or any other small quantity of ordinary fibrous or other packing $r^2$ between the outside of the hoop $j'$ and the gland $w$, as shown.

Referring to Fig. 7, my improved packing is arranged and fixed on the outside of stuffing-box R, and secured to the face of the gland $w$ by means of the gland-bolts $s'$. In this case the hoop $j'$ of cage H is enlarged for the purpose.

Referring to Figs. 18 and 19, the improved packing is fitted into the gland, which has a suitable recess $s^2$ made therefor. The packing is secured in position either by means of the gland-bolts $s'$, Fig. 18, or by means of studs $s^3$, Fig. 19, and in each case the hoop $j^2$ of cage H is enlarged for the purpose.

The improved packing, when used for the purpose described with reference to Figs. 7, 12, 17, 18, and 19, is fitted together in the following manner: The halves of hoops $j'$ and $j^2$ are placed around the piston-rod Y and then secured and fastened together, and the segments $a$ of the packing-ring A are then placed around the piston-rod Y and between the hoops $j'$ $j^2$. The distance-pieces $x$ are then placed between said hoops and are screwed or otherwise attached thereto. The segments $a$ have then their pressing and pulling springs C and D connected, and the packing is complete, ready to either be forced into the stuffing-box R or attached to the gland $w$. Where the improved packing is attached to the gland $w$, to the outside of the stuffing-box R, Fig. 17, the springs C and D may be easily adjusted and the packing inspected from time to time during the time the piston-rod Y is in motion. The same object may also be accomplished when the packing is arranged within the gland $w$, Figs. 18 and 19.

I would have it well understood that my improved segmental packing A may be made where preferred in only two segments, or more than three, and the springs C, C', and $C^2$, and D D' $D^2$ $D^3$ may be diminished or increased in number and arranged one or two or more in compression and less in tension, or vice versa, without departing from the essential part of my present invention. By means of the springs C, C', or $C^2$ endeavoring to expand or press the segments $a$ apart simultaneously with the springs D D' $D^2$ $D^3$, tending to compress, contract, or draw, or close the same together, the friction between the piston-rod or spindle Y, Figs. 7, 12, 17, 18, and 19, or other moving part of machinery and the packing A is considerably reduced, and the springs D D' D² D³ being suitably arranged and constructed to a desired strength, so as to overcome to a necessary extent the expanding force of the springs C, C', or C². A constantly tight or hermetical joint is thereby obtained, and the packing A is caused to wear uniformly. It will therefore now be clearly conceived that the packing A forms, as it were, a perfect cushion, and absolutely floats on the rod Y and within the cage H, and it is this floating of my improved packing which absolutely attains the objects of my present invention.

The several parts of my improvements are composed of material suitably adapted for their various purposes.

Having now particularly described and ascertained the nature of my said invention and in what manner the same is to be performed, I declare that what I claim is—

In metallic packing, the application of springs to metallic segments, the said springs creating two forces, a greater and a less, the springs of the greater force tending to press the segments together or onto a piston-rod or other movable part of a machine for the purpose of forming a hermetical joint, and the lesser force endeavoring to press the segments apart for the purpose of reducing friction, substantially as described.

In testimony that I claim the foregoing I have hereunto set my hand this 16th day of May, 1889.

W. GUY NIXON.

Witnesses:
GREGORY DE SILVA,
A. H. ARNSLIE.